(12) United States Patent
Kariya

(10) Patent No.: US 8,328,986 B2
(45) Date of Patent: Dec. 11, 2012

(54) LAMINATED SHEET, METHOD OF PRODUCING THE SHEET, EXHAUST GAS PROCESSING DEVICE, AND METHOD OF PRODUCING THE DEVICE

(75) Inventor: Satoru Kariya, Ogaki (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 210 days.

(21) Appl. No.: 12/582,330

(22) Filed: Oct. 20, 2009

(65) Prior Publication Data

US 2010/0040513 A1 Feb. 18, 2010

Related U.S. Application Data

(63) Continuation of application No. 11/763,799, filed on Jun. 15, 2007.

(30) Foreign Application Priority Data

Sep. 29, 2006 (JP) .................................. 2006-266376

(51) Int. Cl.
*D21F 13/00* (2006.01)

(52) U.S. Cl. .......... 162/130; 162/129; 162/201; 28/107; 264/112; 422/179; 422/221

(58) Field of Classification Search .................... 28/107; 55/523, DIG. 30; 156/306.3; 162/123, 125, 162/129, 130, 201; 264/112, 113; 422/177, 422/179, 180, 221
See application file for complete search history.

(56) References Cited

U.S. PATENT DOCUMENTS

| | | | |
|---|---|---|---|
| 4,048,363 | A | 9/1977 | Langer et al. |
| 4,863,700 | A | 9/1989 | Ten Eyck |
| 4,929,429 | A | 5/1990 | Merry |
| 4,999,168 | A | 3/1991 | Ten Eyck |
| 5,028,397 | A | 7/1991 | Merry |
| 5,332,609 | A | 7/1994 | Corn |
| 6,613,295 | B1 | 9/2003 | Kageyama et al. |
| 7,550,118 | B2 | 6/2009 | Merry |
| 2003/0185724 | A1 | 10/2003 | Anji et al. |
| 2006/0154040 | A1 | 7/2006 | Merry |
| 2007/0140929 | A1 | 6/2007 | Watanabe et al. |

(Continued)

FOREIGN PATENT DOCUMENTS

EP 1 696 110 A1 8/2006

(Continued)

OTHER PUBLICATIONS

Machine Translation of the Detailed Description of JP 2003-293758, Oct. 15, 2003.

*Primary Examiner* — Robert Clemente
(74) *Attorney, Agent, or Firm* — Oblon, Spivak, McClelland, Maier & Neustadt, L.L.P.

(57) ABSTRACT

A disclosed laminated sheet to be wound around an outer surface of an exhaust gas processing unit includes a first mat containing first inorganic fibers and a second mat containing second inorganic fibers, the second mat being laminated on the first mat. The average fiber length of the first inorganic fibers is larger than the average fiber length of the second inorganic fibers and the laminated sheet is to be wound around the exhaust gas processing unit such that the first mat forms an outermost layer. Development of cracks in the outer surface of the laminated sheet can be prevented by winding the laminated sheet around an exhaust gas processing unit such that the first mat faces outward.

7 Claims, 11 Drawing Sheets

U.S. PATENT DOCUMENTS

| | | |
|---|---|---|
| 2008/0175764 A1 | 7/2008 | Sako |
| 2009/0049831 A1 | 2/2009 | Yasuda et al. |

FOREIGN PATENT DOCUMENTS

| | | |
|---|---|---|
| JP | 63-159562 | 7/1988 |
| JP | 03-008857 | 1/1991 |
| JP | 08-156162 | 6/1996 |
| JP | 08-243325 | 9/1996 |
| JP | 3072281 B | 5/2000 |
| JP | 2003-011259 | 1/2003 |
| JP | 2003-293758 | 10/2003 |
| WO | 2004/011785 | 2/2004 |
| WO | 2005/106222 | 11/2005 |
| WO | 2006/020058 A1 | 2/2006 |
| WO | 2006/065534 | 6/2006 |

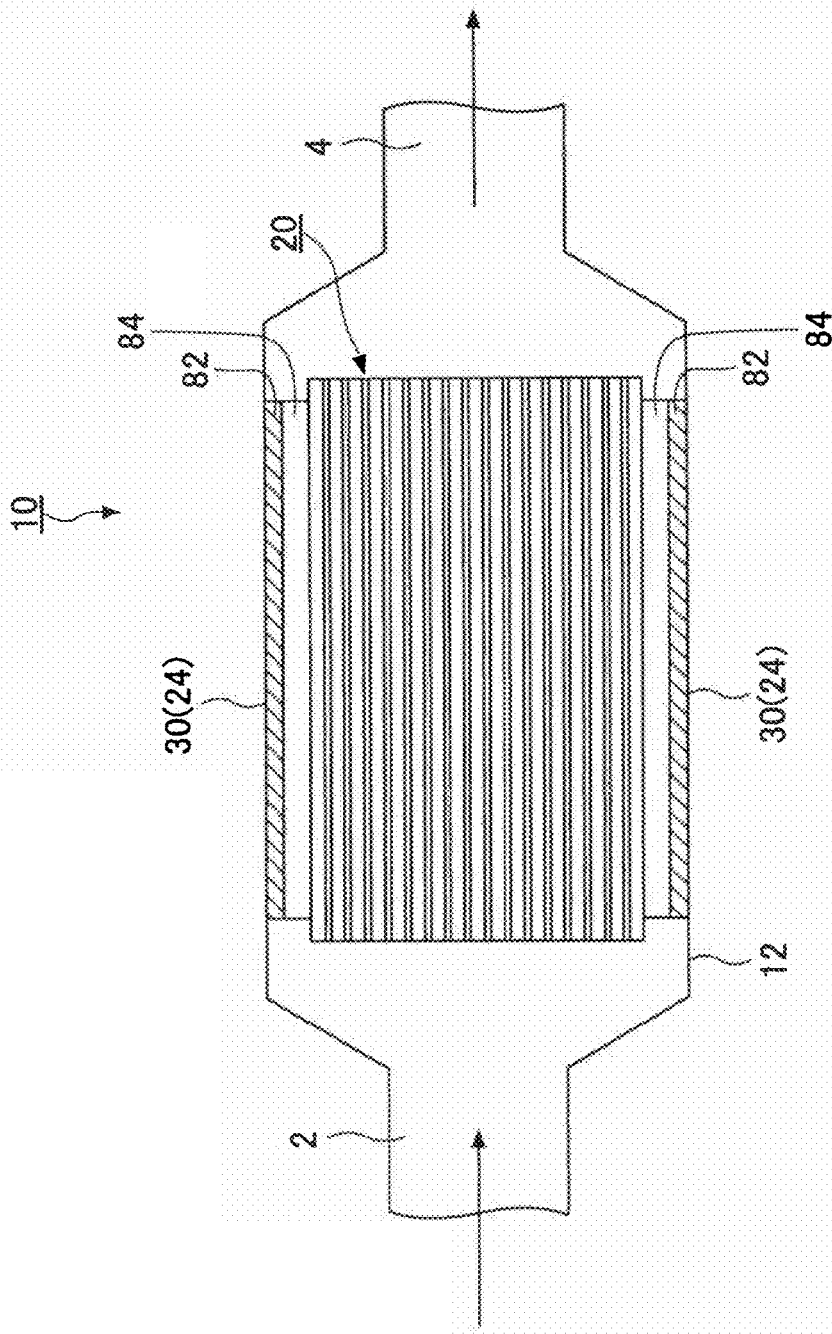

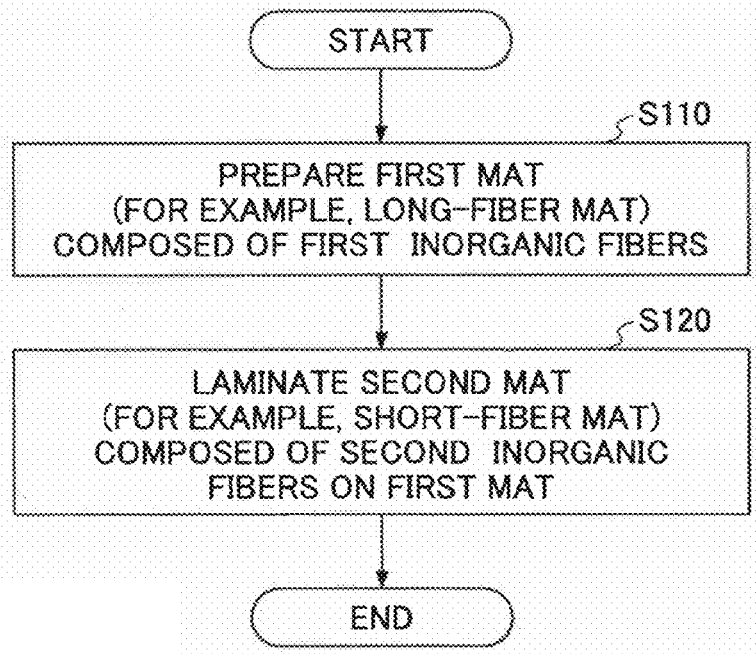
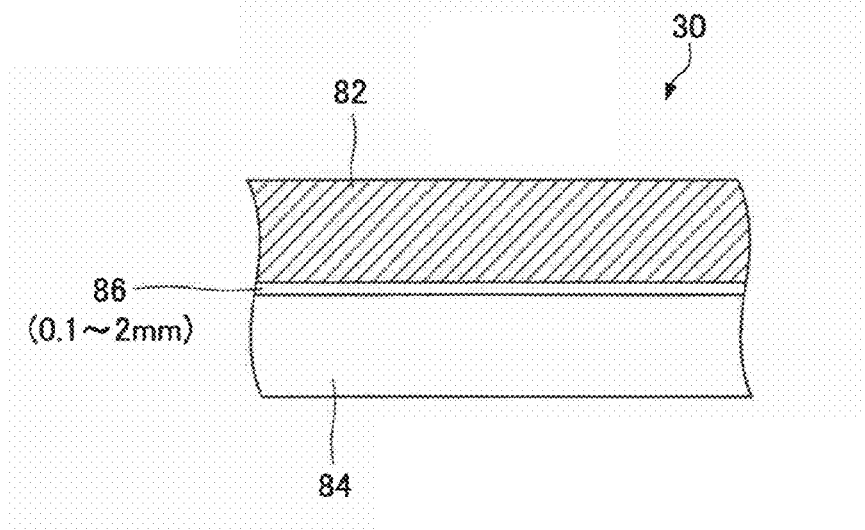

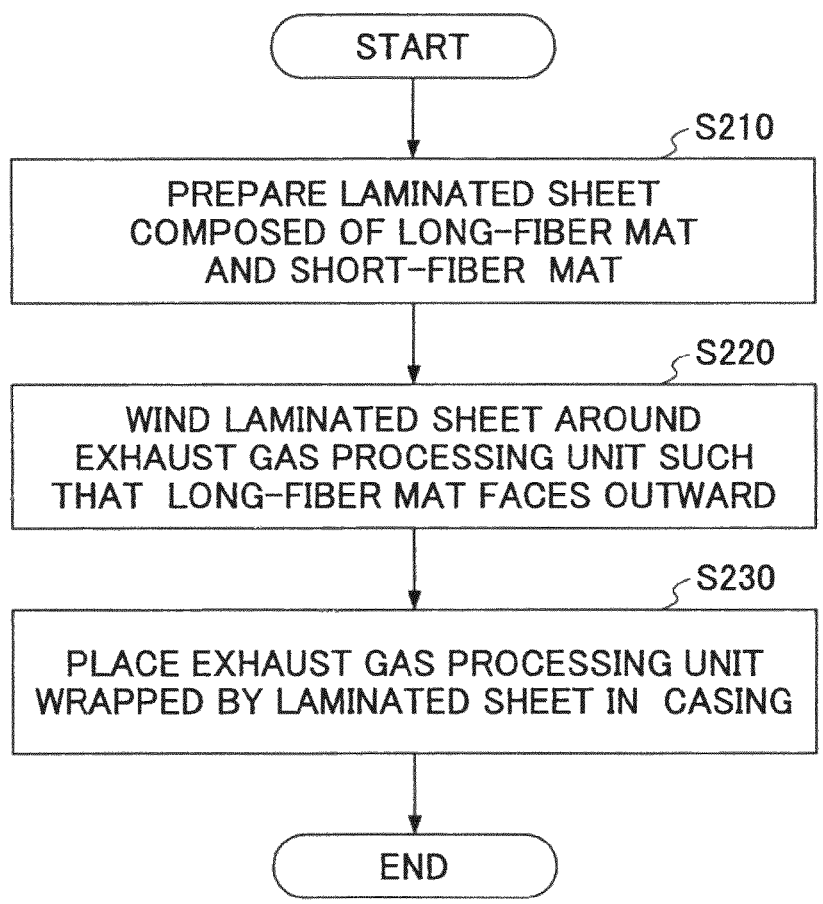

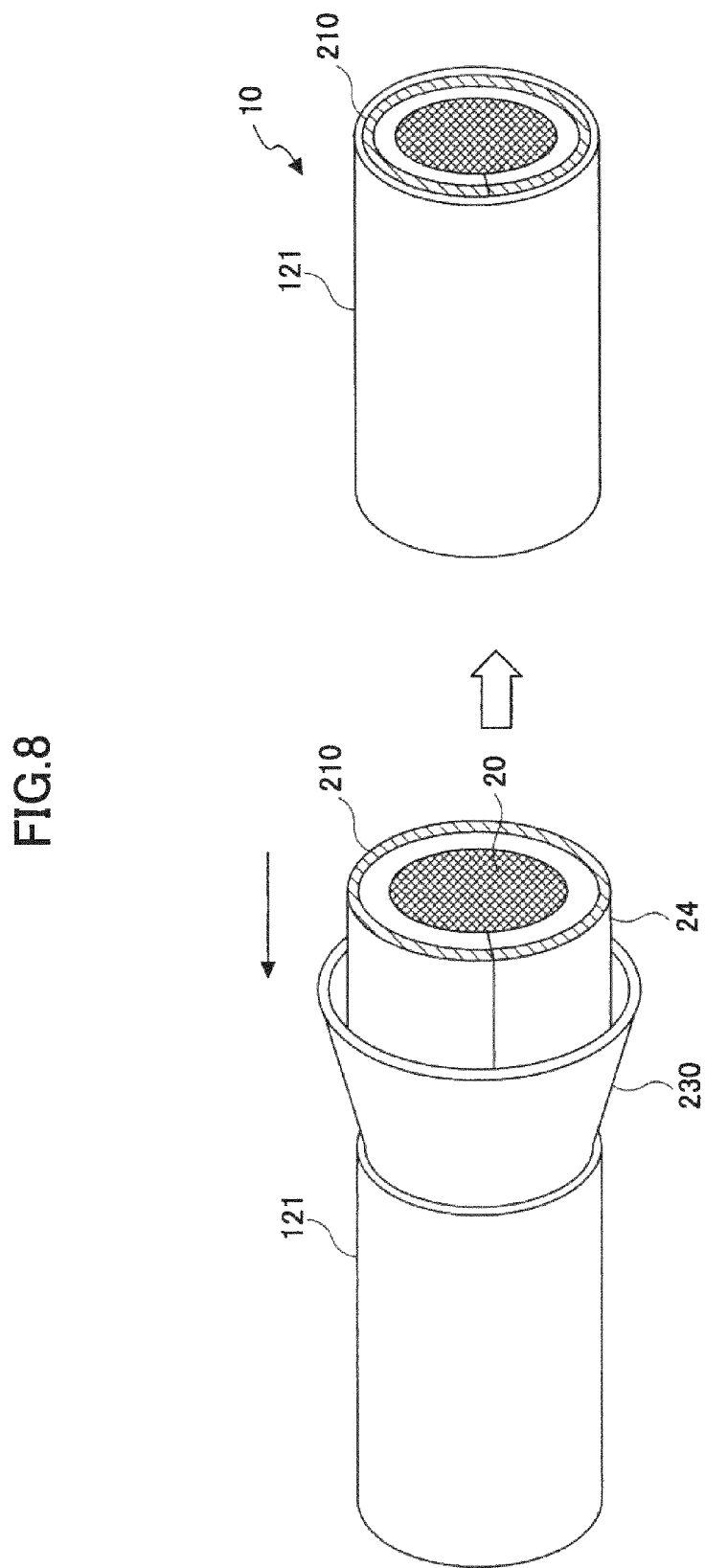

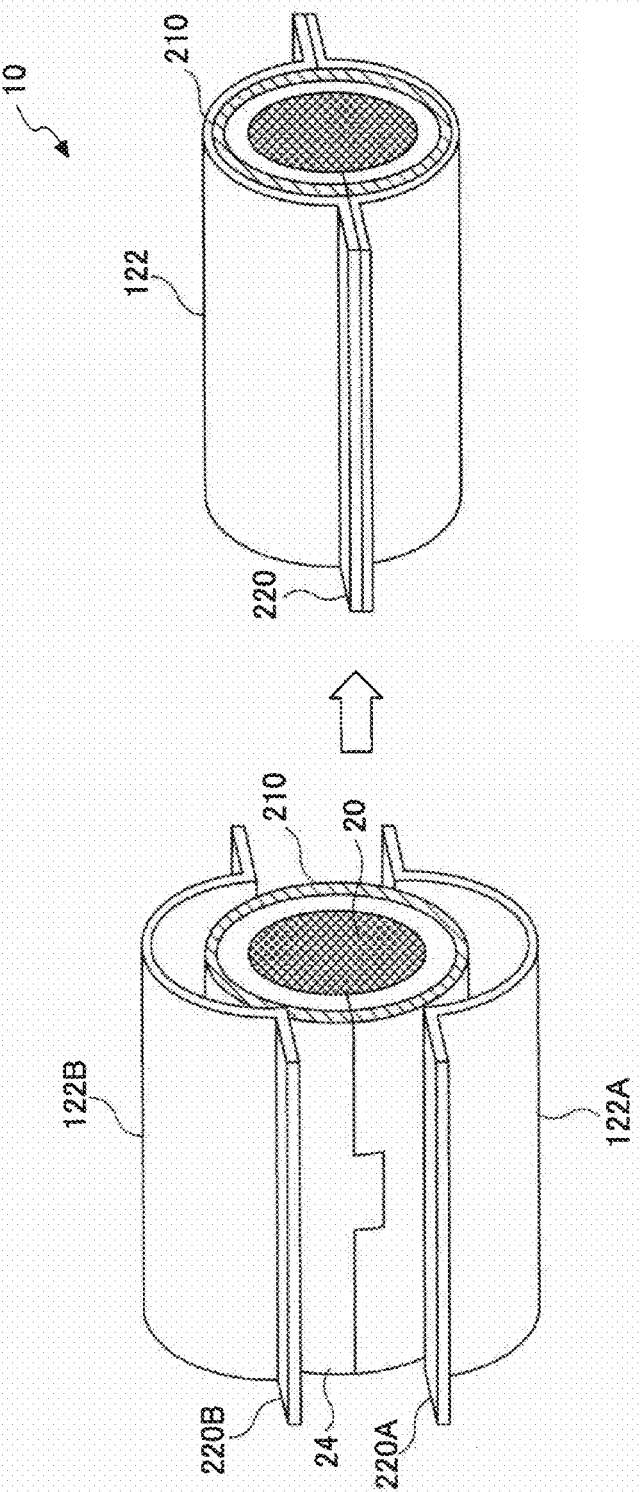

LAMINATED SHEET, METHOD OF PRODUCING THE SHEET, EXHAUST GAS PROCESSING DEVICE, AND METHOD OF PRODUCING THE DEVICE

CROSS REFERENCE TO RELATED APPLICATIONS

The present application is a continuation application of and claims the benefit of priority from U.S. application Ser. No. 11/763,799, filed Jun. 15, 2007, which is based on Japanese Priority Application No. 2006-266376, filed on Sep. 29, 2006, the entire contents of each of which are hereby incorporated herein by reference.

Also, the entire contents of Japanese Patent No. 3072281 and JIS Z2500-4002 are hereby incorporated herein by reference.

BACKGROUND OF THE INVENTION

1. Field of the Invention

The present invention generally relates to a laminated sheet, a method of producing the laminated sheet, an exhaust gas processing device including the laminated sheet as a holding sealer, and a method of producing the exhaust gas processing device.

2. Description of the Related Art

The number of cars in the world has greatly increased since the beginning of this century, and along with the increase in the number of cars, the amount of exhaust gas from internal combustion engines of cars has greatly increased. Especially, exhaust gas from diesel engines contains various pollutants and is a serious threat to the world environment.

To reduce pollution resulting from exhaust gas, various exhaust gas processing devices have been proposed and put into practical use. Normally, an exhaust gas processing device is provided in the path of an exhaust pipe connected to an exhaust gas manifold of an engine, and includes a casing composed, for example, of metal and an exhaust gas processing unit disposed in the casing and having a large number of cells separated by cell walls. In many cases, these cells are arranged to form a honeycomb structure, and in such cases, the exhaust gas processing unit is simply called a "honeycomb structure". Examples of exhaust gas processing units include catalyst carriers and exhaust gas filters such as a diesel particulate filter (DPF). Taking a DPF as an example, when exhaust gas passes through the cells of a honeycomb structure (or an exhaust gas processing unit), fine particles (particulates) are trapped by the cell walls and removed from the exhaust gas. Examples of materials for an exhaust gas processing unit include metals, alloys, and ceramics. Honeycomb filters composed of cordierite are popular as ceramic exhaust gas processing units. In these days, in terms of heat resistance, mechanical strength, and chemical stability, porous silicon carbide sintered bodies are widely used as materials for exhaust gas processing units.

Normally, a holding sealer is provided between an exhaust gas processing unit and a casing. A holding sealer prevents an exhaust gas processing unit from hitting the inner side of a casing when, for example, an automobile is running and thereby prevents damage to the exhaust gas processing unit. Also, a holding sealer prevents leakage of exhaust gas through a gap between an exhaust gas processing unit and a casing. Further, a holding sealer prevents an exhaust gas processing unit from falling off due to exhaust gas pressure. Meanwhile, to maintain reactivity of an exhaust gas processing unit, it is necessary to keep the exhaust gas processing unit at high temperature. For this purpose, a holding sealer must also have good thermal insulation performance. Holding sealers composed of inorganic fibers, such as alumina fibers, are known to satisfy requirements as described above.

An exemplary holding sealer composed of inorganic fibers is wound around at least a portion, other than the openings, of the outer surface of an exhaust gas processing unit, with two ends of the holding sealer being joined together. The holding sealer is fixed with tape to the exhaust gas processing unit. The exhaust gas processing unit wrapped by the holding sealer is inserted into a casing to produce an exhaust gas processing device.

Recent internal combustion engines emit exhaust gases at high temperatures and pressures. For this reason and to achieve the goals mentioned below, it is necessary to improve the thermal insulation performance of holding sealers.

(i) To prevent creation of a gap between a holding sealer and a casing which is caused by expansion of the casing due to heat transferred from the exhaust gas processing unit through the holding sealer.

(ii) To prevent degradation due to heat of parts (for example, instruments) attached to the outer surface of a casing.

(iii) To improve efficiency of a recycling process for certain types of exhaust gas processing units such as DPFs (in a recycling process, trapped particulates are combusted at high temperature to enable reuse of exhaust gas processing units).

One way to achieve the above goals is to increase the gap between an exhaust gas processing unit and a casing and increase the thickness of a holding sealer to improve its thermal insulation performance. However, as the thickness of a holding sealer increases, the difference between the outer circumference and the inner circumference of the holding sealer, when wound around an exhaust gas processing unit, increases. A larger difference between outer and inner circumferences increases the possibility of developing cracks in the outer surface (that is opposite to a surface in contact with the exhaust gas processing unit) of a holding sealer. Such cracks in turn lead to leaks of unprocessed exhaust gas.

Patent document 1 discloses an exhaust gas processing device including an exhaust gas processing unit and a holding sealer. Multiple grooves are formed on a surface (inner surface), which is in contact with the exhaust gas processing unit, of the holding sealer to prevent development of cracks resulting from the difference between outer and inner circumferences. The grooves formed on the holding sealer reduce the influence of the difference between outer and inner circumferences and thereby prevent development of cracks as well as resulting leaks of unprocessed exhaust gas.

[Patent document 1] Japanese Patent No. 3072281

SUMMARY OF THE INVENTION

According to an embodiment of the present invention, a laminated sheet includes a first mat containing first inorganic fibers; and a second mat containing second inorganic fibers, the second mat being laminated on the first mat; wherein average fiber length of the first inorganic fibers is larger than the average fiber length of the second inorganic fibers.

The first inorganic fibers and the second inorganic fiber may be made of the same material or different materials.

The average fiber length of the first inorganic fibers is preferably within a range between about 20 mm and about 120 mm and the average fiber length of the second inorganic fibers is preferably within a range between about 0.5 mm and about 10 mm.

The first mat and/or the second mat may further contain a binder.

The laminated sheet of an embodiment of the present invention may also include an interface layer at the interface between the first mat and the second mat. The thickness of the interface layer is preferably within a range between about 0.05 mm and about 2 mm.

The thickness of the laminated sheet is preferably within a range between about 6 mm and about 20 mm.

According to another embodiment of the present invention, a method of producing a laminated sheet includes a first step of preparing a first mat containing first inorganic fibers; and a second step of laminating a second mat containing second inorganic fibers on the first mat; wherein an average fiber length of the first inorganic fibers is larger than an average fiber length of the second inorganic fibers.

The second step may include a substep of forming the second mat directly on the first mat.

The second step may include substeps of separately preparing the second mat and then laminating the first mat and the second mat. In this case, the second step may further include a substep of joining the first mat and the second mat by adhesive bonding and/or by sewing.

The first mat may be prepared by a needling method.

The second mat may be prepared by a sheet making method.

According to another embodiment of the present invention, an exhaust gas processing device includes an exhaust gas processing unit; and a holding sealer wound around at least a portion of the outer surface of the exhaust gas processing unit; wherein the holding sealer is composed of the laminated sheet as described above and wound around the exhaust gas processing unit such that the first mat of the laminated sheet faces outward.

With this configuration, development of cracks in the outer surface of the holding sealer can be effectively prevented because the first mat forming the outer surface of the holding sealer is composed of inorganic fibers having a larger average fiber length, i.e. a higher tensile strength, than that of the inorganic fibers of the second mat.

A catalyst carrier or an exhaust gas filter may be used as the exhaust gas processing unit of the above exhaust gas processing device.

Still another embodiment of the present invention provides a method of producing an exhaust gas processing device including an exhaust gas processing unit and a holding sealer wound around at least a portion of an outer surface of the exhaust gas processing unit. This method includes the steps of preparing the holding sealer with the laminated sheet produced as described above and winding the holding sealer around the exhaust gas processing unit such that the first mat of the laminated sheet faces outward.

Also in this case, a catalyst carrier or an exhaust gas filter may be used as the exhaust gas processing unit.

BRIEF DESCRIPTION OF THE DRAWINGS

FIG. 4 is a drawing illustrating an exemplary configuration of an exhaust gas processing device according to an embodiment of the present invention;

FIG. 5 is a flowchart showing an exemplary process of producing a laminated sheet according to an embodiment of the present invention;

FIG. 6 is a cut-away side view of a laminated sheet produced by a direct lamination method according to an embodiment of the present invention;

FIG. 7 is a flowchart showing an exemplary process of producing an exhaust gas processing device according to an embodiment of the present invention;

FIG. 8 is a drawing illustrating a process of fitting an exhaust gas processing unit wrapped by a holding sealer into a casing by a press-fit method;

FIG. 9 is a drawing illustrating a process of fitting an exhaust gas processing unit wrapped by a holding sealer in a casing by a clamshell method;

DESCRIPTION OF THE PREFERRED EMBODIMENTS

Preferred embodiments of the present invention are described below with reference to the accompanying drawings.

Figure 1:
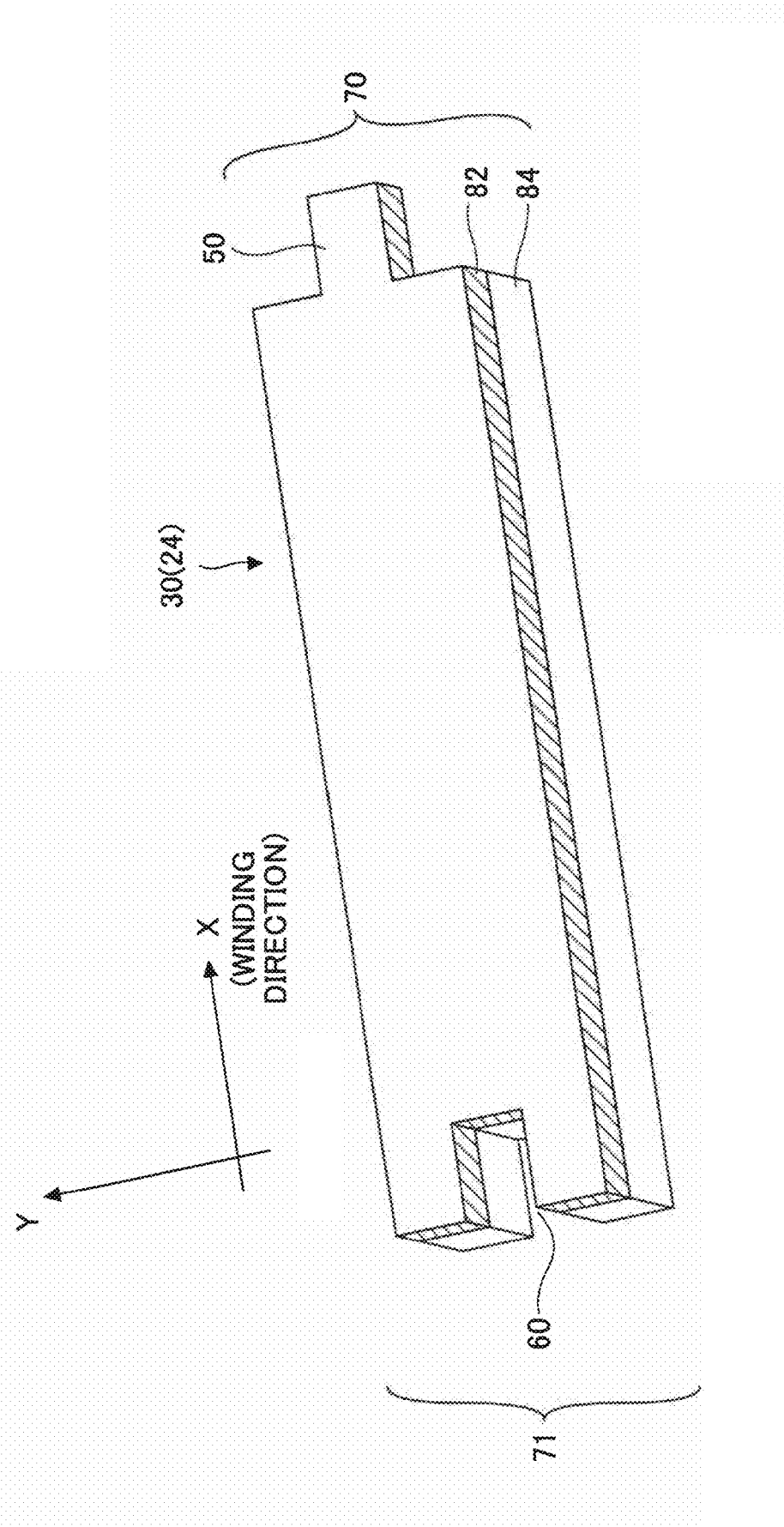
FIG. 1 is a drawing illustrating an exemplary laminated sheet according to an embodiment of the present invention.
Figure 2:
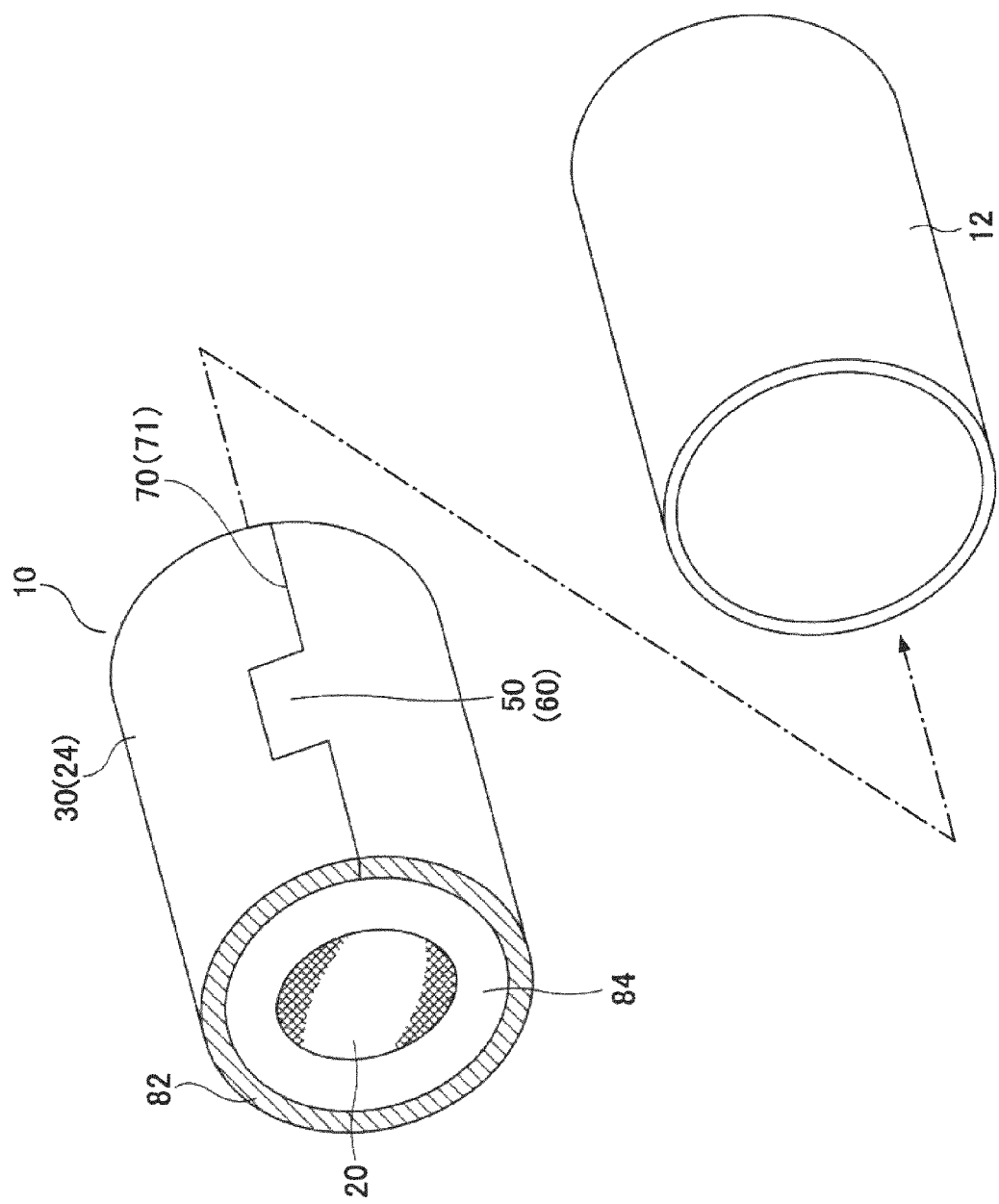
FIG. 2 is a drawing used to describe assembly of the exemplary laminated sheet, an exhaust gas processing unit, and a casing to form an exhaust gas processing device.

FIG. 1 is a drawing illustrating an exemplary laminated sheet according to an embodiment of the present invention. The shape of a laminated sheet according to an embodiment of the present invention is not limited to that shown in FIG. 1. FIG. 2 is a drawing used to describe assembly of the exemplary laminated sheet, an exhaust gas processing unit, and a casing to form an exhaust gas processing device.

A laminated sheet 30 of FIG. 1 is used as a holding sealer 24 of an exhaust gas processing device 10 of FIG. 2 and is designed to be wound around an exhaust gas processing unit 20 of FIG. 2 that is, for example, a catalyst carrier. As shown in FIG. 1, the laminated sheet 30 has a protrusion 50 and a recess 60 at corresponding ends 70 and 71 that are orthogonal to the direction (X direction) in which the laminated sheet 30 is to be wound. After being wound around the exhaust gas processing unit 20, the protrusion 50 and the recess 60 of the laminated sheet 30 are fit together as shown in FIG. 2 and the laminated sheet 30 is thereby fixed to the exhaust gas processing unit 20. The exhaust gas processing unit 20 wrapped by the laminated sheet 30 is, for example, press-fit into a casing 12 made of a metal cylinder to form the exhaust gas processing device 10. The laminated sheet 30 is mainly composed of inorganic fibers and may also include a binder as described later.

The laminated sheet 30 is produced by laminating at least two types of mats composed of inorganic fibers. The average fiber length of the inorganic fibers is different from one mat to another. For example, the laminated sheet 30 shown in FIG. 1 is produced by laminating a first mat 82 and a second mat 84. The average fiber length of inorganic fibers constituting the first mat 82 is larger than that of the second mat 84. Hereafter, the first mat 82 and the second mat 84 are also called the long-fiber mat 82 and the short-fiber mat 84, respectively.

Exemplary characteristics of the laminated sheet 30 are described below.

In the case of a conventional sheet (a holding sealer), when it is wound around an exhaust gas processing unit, tensile stress is applied to the outer surface of the conventional sheet because of a difference L (LO–LI) between an outer circumference LO and an inner circumference LI of the conventional sheet. The influence of the difference L increases as the thickness of the conventional sheet increases. Therefore, increasing the thickness of a conventional sheet increases the possibility of developing cracks in its outer surface when it is wound around an exhaust gas processing unit. If cracks are formed in a surface of a sheet, unprocessed exhaust gas may leak through the cracks out of the exhaust gas processing device without going through the exhaust gas processing unit. One way to obviate this problem is to form multiple grooves, which are orthogonal to the winding direction, on the inner surface of a sheet (a surface that touches an exhaust gas processing unit when the sheet is wound around) so that the influence of the difference L is reduced. However, with this conventional method, it is necessary to change the sizes and shapes of grooves on a sheet to suit the shapes and dimensions of an exhaust gas processing unit to be used. For example, the width of and the pitch between the grooves to be formed on the inner surface of a sheet are determined such that the total width of grooves (width×number of grooves) becomes equal to the difference L. Also, with the conventional method, it is necessary to adjust the depth of the grooves according to the thickness of a sheet. Thus, the conventional method greatly reduces the efficiency in producing sheets.

Meanwhile, the laminated sheet 30 of this embodiment is made up of the long-fiber mat 82 and the short-fiber mat 84. Normally, the tensile strength of a mat composed of inorganic fibers having a larger average fiber length is higher than that of a mat composed of inorganic fibers having a smaller average fiber length. In this embodiment, since the laminated sheet 30 is wound around the exhaust gas processing unit 20 such that the long-fiber mat 82 faces outward, development of cracks due to the difference between outer and inner circumferences can be effectively prevented. Also, unlike a conventional sheet having grooves for reducing the influence of the difference between outer and inner circumferences, the laminated sheet 30 according to an embodiment of the present invention can be used for exhaust gas processing units having different shapes and dimensions without changing its configuration and therefore can be produced efficiently.

Thus, the above embodiment of the present invention makes it possible to prevent development of cracks, which may be caused by the difference between the outer and inner circumferences, in the outer surface of the laminated sheet 30 wound around the exhaust gas processing unit 20. Accordingly, using the laminated sheet 30 as a holding sealer of an exhaust gas processing device makes it possible to effectively prevent leaks of unprocessed exhaust gas.

Figure 3:
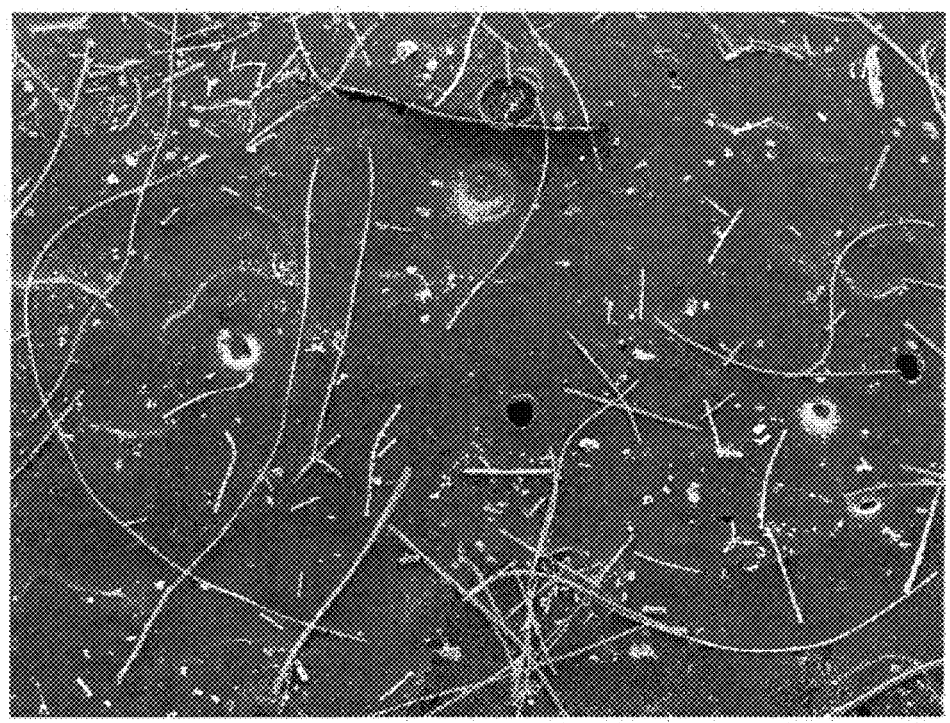
FIG. 3 is a SEM photograph used to measure the average fiber length of inorganic fibers.

In this embodiment, the average fiber lengths of inorganic fibers in the short-fiber mat 84 and the long-fiber mat 82 were measured as described below. To measure the average fiber length of the short-fiber mat 84, sample mats (each having a size of 10 cm×10 cm) were prepared and ten areas on each mat were randomly selected. Fibers were sampled from the ten areas and the sampled fibers were photographed using a scanning electron microscope (SEM) at 50× magnification. The lengths of at least 50 fibers were measured for each of the ten areas. Then, the measured lengths of fibers from all of the ten areas were averaged to obtain the average fiber length of the mat. FIG. 3 is a SEM photograph used to measure the average fiber length of inorganic fibers of the short-fiber mat 84. To measure the average fiber length of the long-fiber mat 82, sample mats (each having a size of 10 cm×10 cm) were prepared and ten areas on each mat were randomly selected. Fibers were sampled from the ten areas and the sampled fibers were photographed using an optical microscope at 10× magnification. The lengths of at least 50 fibers were measured for each of the ten areas. Then, the measured lengths of fibers from all of the ten areas were averaged to obtain the average fiber length of the mat.

The average fiber length of inorganic fibers of the long-fiber mat 82 is preferably between about 20 mm and about 120 mm, more preferably between about 30 mm and about 70 mm, and still more preferably between about 40 mm and about 60 mm. The average fiber length of inorganic fibers of the short-fiber mat 84 is preferably between about 0.5 mm and about 10 mm, more preferably between about 1 mm and about 5 mm, and still more preferably between about 2 mm and about 4 mm. Also, the average fiber length of inorganic fibers of the long-fiber mat 82 is preferably about 6 or more times larger than that of inorganic fibers of the short-fiber mat 84, and more preferably about 10 or more times larger.

The thickness of a laminated sheet according to an embodiment of the present invention is preferably, but not limited to, between about 6 mm and about 20 mm. Normally, a thin sheet (for example, having a thickness smaller than about 6 mm) is less likely to develop cracks. Therefore, when the thickness is small, a single layer sheet made of a long-fiber mat may be used instead of a laminated sheet according to an embodiment of the present invention. The density of a laminated sheet according to an embodiment of the present invention is preferably, but not limited to, between about 0.15 g/cm$^3$ and about 0.30 g/cm$^3$. The grammage of a laminated sheet according to an embodiment of the present invention is preferably, but not limited to, between about 500 g/m$^2$ and about 3000 g/m$^2$. "Grammage" in this case indicates the gram weight of fibers per unit area of a laminated sheet. Also, when a binder is contained in a laminated sheet, "grammage" may indicate the gram weight of fibers and binder per unit area of the laminated sheet.

In this embodiment, the thicknesses, densities, and grammages of a long-fiber mat and a short-fiber mat constituting a laminated sheet are not limited to specific values. Also in this embodiment, the ratio of the thickness of a long-fiber mat to the thickness of a short-fiber mat is preferably, but not limited to, between about 2:8 and about 5:5.

As described above, the laminated sheet 30 of this embodiment is produced by laminating the long-fiber mat 82 and the short-fiber mat 84. To improve the adhesion strength between the long-fiber mat 82 and the short-fiber mat 84, an interface layer may be provided at the interface between the two mats. In the present application, an "interface layer" indicates any layer that is provided at the interface between two adjacent layers and that is different in composition from the adjacent layers. Examples of interface layers include an adhesive layer intentionally formed on one or both of the surfaces of adjacent layers to bond them together and a third layer 86 (see FIG. 6) that is spontaneously formed at the interface between adjacent layers as a result of concentration of, for example, a binder during the production process of a laminated sheet.

The laminated sheet 30 is wound around the exhaust gas processing unit 20 such that the long-fiber mat 82 faces outward (i.e. to face the casing 12) and fixed to the exhaust gas processing unit 20 by fitting the protrusion 50 and the recess 60 together. The exhaust gas processing unit 20 wrapped by the laminated sheet 30 is fitted into the casing 12 by a press-fit method, a clamshell method, a winding/fastening method, or a sizing method to form the exhaust gas processing device 10.

The methods of fitting the exhaust gas processing unit 20 into the casing 12 are described later in detail.

FIG. 4 is a drawing illustrating an exemplary configuration of the exhaust gas processing device 10. In this example, the exhaust gas processing unit 20 is implemented as a catalyst carrier having multiple through-holes extending parallel to the direction of gas flow. The catalyst carrier, for example, is composed of porous silicon carbide and has a honeycomb structure. However, the exhaust gas processing device 10 may also be configured otherwise. For example, the exhaust gas processing unit 20 may be implemented as a DPF with the ends of its through-holes occluded in a checkerboard pattern. With the exhaust gas processing device 10 configured as described above, development of cracks in the outer surface of the laminated sheet 30 wound around the exhaust gas processing unit 20 can be effectively prevented. In other words, the above configuration prevents unprocessed exhaust gas from leaking through cracks in a sheet out of an exhaust gas processing device.

An exemplary process of producing a laminated sheet according to an embodiment of the present invention is described below. FIG. 5 is a flowchart showing an exemplary process of producing a laminated sheet according to an embodiment of the present invention.

As shown in FIG. 5, the exemplary process includes the steps of preparing a first mat composed of first inorganic fibers (step S110) and laminating a second mat composed of second inorganic fibers on the first mat (step S120).

In the descriptions below, a long-fiber mat is prepared in step S110 and a short-fiber mat is laminated on the long-fiber mat in step S120 to produce a laminated sheet of this embodiment. However, a laminated sheet of this embodiment may also be produced by preparing a short-fiber mat in step S110 and then laminating a long-fiber mat on the short-fiber mat in step S120.

The long-fiber mat may be produced by a needling method. In this embodiment, a "needling method" indicates a method of producing a mat which method includes a step of moving a fiber-interweaving tool such as a needle in and out of a mat. The needling method is described later in more detail. On the other hand, the short-fiber mat may be produced by a sheet making method. In this embodiment, a "sheet making method" indicates a method of making a mat which method includes steps of fiber opening, slurrying, and press-drying. The sheet making method is described later in more detail.

There are roughly two methods for laminating the long-fiber mat and the short-fiber mat.

One of the methods is called an "indirect lamination" method where a long-fiber mat and a short-fiber mat are produced separately and the mats are bonded together at the lamination interface to produce a laminated sheet. In the indirect lamination method, the long-fiber mat and the short-fiber mat are bonded at the interface, for example, by using an adhesive, by sewing, or by vacuum pressure bonding (where the mats are stacked, the stacked mats are put in a closed container, and the closed container is evacuated). As an adhesive, an acrylic adhesive or an acrylate latex may be used. The thickness of an adhesive layer is preferably, but is not limited to, between about 0.05 mm and about 2 mm. As described above, the adhesive layer may also be called an interface layer.

The other one of the methods is called a "direct lamination" method where a short-fiber mat is formed directly on a long-fiber mat and a laminated sheet composed of the two mats is thereby produced. It is also possible to prepare a short-fiber mat first and to form a long-fiber mat directly on the short-fiber mat. The direct lamination method eliminates the need to prepare two mats separately and thereby makes it possible to simplify the production process.

An exemplary process of producing a laminated sheet according to an embodiment of the present invention is described below in more detail.

(Preparation of Long-Fiber Mat)

As described above, a long-fiber mat may be produced by a needling method. In the exemplary process of producing a long-fiber mat below, a mixture of alumina and silica is used as the material of inorganic fibers for the long-fiber mat. However, the material of inorganic fibers is not limited to a mixture of alumina and silica. For example, inorganic fibers for the long-fiber mat may be made of alumina or silica alone. Also, other materials may be used to produce inorganic fibers for the long-fiber mat.

A precursor of inorganic fibers is prepared by adding silica sol to a basic aluminum chloride solution (aluminum content: 70 g/l, Al/Cl=1.8 [atomic ratio]) so that the proportion of aluminum to silica becomes, for example, about 60-80 to about 40-20. The proportion of aluminum to silica is more preferably about 70-74 to about 30-26. If the percentage of alumina is about 60% or lower, the percentage of mullite generated from alumina and silica becomes low. A low percentage of mullite results in high thermal conductivity of the produced long-fiber mat and therefore reduces the thermal insulation performance of the long-fiber mat.

Next, an organic polymer of, for example, polyvinyl alcohol is added to the precursor of alumina fibers. The resulting liquid is concentrated and a spinning solution is thereby prepared. Then, the spinning solution is spun by a blowing method.

In the blowing method, fibers are formed by using streams of air jetted out from air nozzles and streams of the spinning solution ejected from spinning solution supplying nozzles. The gas flow speed from each slit of the air nozzles is preferably about 40 m/s to about 200 m/s. The diameter of each of the spinning solution supplying nozzles is preferably between about 0.1 mm and about 0.5 mm and the flow rate of the spinning solution from each of the spinning solution supplying nozzles is preferably between about 1 ml/h and about 120 ml/h and more preferably between about 3 ml/h and about 50 ml/h. With the above conditions, the spinning solution ejected from the spinning solution supplying nozzles does not form a mist but sufficiently stretches in the form of fibers and the formed fibers do not easily adhere to each other. Thus, uniform alumina fibers with a narrow fiber diameter distribution can be prepared by optimizing the spinning conditions.

The average diameter of the inorganic fibers is preferably, but not limited to, between about 3 μm and about 10 μm.

The average diameter of the inorganic fibers is measured as described below. The alumina fibers prepared as described above are put in a cylinder and compression-milled at 20.6 MPa to prepare a sample. The sample is put on a sieve and a portion of the sample passing through the sieve is used as a specimen for electron microscopic observation. Gold, for example, is deposited on the specimen and the specimen is photographed using an electron microscope at about 1500× magnification. Using the photograph, the diameters of at least 40 fibers are measured. The above steps are repeated for five specimens and the measured values are averaged to obtain the average diameter of the inorganic fibers.

The obtained alumina fibers are stacked to prepare a raw sheet. Then, a needling step is performed on the raw sheet. Normally, a needling device is used for this step.

A needling device includes a needle board movable back and forth in the needling direction (for example, in the vertical direction) and a pair of support plates to be placed on the upper and lower surfaces of the raw sheet. On the needle board, a large number of needles for piercing the raw sheet are arranged, for example, at a density of about 25 to about 5000 needles per 100 cm$^2$. Each of the support plates has a large number of through-holes corresponding to the needles. The raw sheet is sandwiched between the support plates and the needles are caused to move in and out of the raw sheet by moving the needle board toward and away from the raw sheet. As a result, a large number of interwoven points where the alumina fibers are interwoven with each other are formed. The needling device may also include a conveying unit for conveying the raw sheet in a direction (that is substantially parallel to the upper and lower surfaces of the raw sheet) at a uniform conveying speed (for example, at about 20 mm/sec). The conveying unit enables forwarding the raw sheet while needling the raw sheet and thereby eliminates the need to manually forward the raw sheet each time after the needle board is moved back and forth.

As an alternative configuration, a needling device may include two needle boards. In this case, a support plate is provided for each of the needle boards. The raw sheet is sandwiched between the support plates and the needle boards are placed, respectively, above and below the raw sheet. Needles on one of the needle boards are arranged so as not to overlap with needles on the other one of the needle boards. Each of the support plates has through-holes corresponding to the needles of both of the needle boards so that the needles do not touch the support plates when needling the raw sheet. With the needling device having the alternative configuration, the raw sheet is sandwiched by the support plates and needled from both sides by the two needling boards. Thus, the needling device having the alternative configuration makes it possible to reduce the time needed for a needling step. Also, the alternative configuration makes it possible to reduce the number of needles on one needle board while increasing the total number of needles.

At the interwoven points formed by the needling step, the interwoven fibers are oriented in the direction the fibers are stacked. This structure increases the strength in the stack direction of the raw sheet.

After the needling step, the raw sheet is heated from the ambient temperature and calcined for about 0.5 to about 2 hours at a maximum temperature of about 1250° C. to produce a long-fiber mat.

The long-fiber mat, if needed, may be impregnated with a binder such as an organic resin. This impregnation step makes it possible to reduce the bulk of the long-fiber mat and to prevent inorganic fibers from falling off the long-fiber mat. The impregnation step may also be performed at a later stage. For example, when a laminated sheet is produced by the indirect lamination method, the impregnation step may be performed after the long-fiber mat and the short-fiber mat are bonded. In this case, the impregnation step can be performed from either side of the produced laminated sheet When a laminated sheet is produced by the direct lamination method, the long-fiber mat can be impregnated with a binder, as described later, during a step of forming the short-fiber mat on the long-fiber mat. Therefore, in this case, a separate impregnation step is not necessary. Also, even in the direct lamination method, the impregnation step may be performed after a laminated sheet is produced.

In the impregnation step, the amount of binder in an impregnated mat or laminated sheet is preferably between about 1.0 wt % and about 10.0 wt %. When the amount of binder is about 1.0 wt % or more, the binder can sufficiently prevent the inorganic fibers from falling off. When the amount of binder is 10.0 wt % or less, the amount of organic components in exhaust gas emitted from an exhaust gas processing device does not increase.

As a binder, an organic binder such as an epoxy resin, an acrylic resin, a gum resin, or a styrene resin is preferable. For example, acrylic rubber (ACM), acrylonitrile-butadiene rubber (NBR), and styrene butadiene rubber (SBR) may be used.

To impregnate a long-fiber mat with a binder, an aqueous dispersion of the binder is sprayed onto the long-fiber mat. The excess solid content and water added to the long-fiber mat in the impregnation step are removed as described below.

The excess solid content may be removed by suction using a suction device such as a vacuum pump. The excess water may be removed by heating the long-fiber mat at a temperature between about 90° C. and about 160° C. and/or by compressing the long-fiber mat at a pressure between about 40 kPa and about 100 kPa.

A long-fiber mat composed of inorganic fibers having an average fiber length between about 20 mm and about 120 mm is prepared through the process as described above.

(Preparation of Short-Fiber Mat)

As described above, a short-fiber mat may be produced by a sheet making method. In the exemplary process of producing a short-fiber mat below, a mixture of alumina and silica is used as the material of inorganic fibers for the short-fiber mat. However, the material of inorganic fibers is not limited to a mixture of alumina and silica. For example, inorganic fibers for the short-fiber mat may be made from alumina or silica alone. Also, other materials may be used to produce inorganic fibers for the short-fiber mat.

First, a fiber opening step is performed.

The fiber opening step may be composed of a dry opening step alone or a dry opening step and a wet opening step. In the dry opening step, inorganic fibers prepared as described in the exemplary process of producing a long-fiber mat are opened using, for example, a feather mill. In the wet opening step, flocculent fibers obtained by the dry opening step are put into a wet opening device and opened further. As a wet opening device, a pulper or a mixer may be used. Through the above fiber opening step, opened raw fibers are obtained.

Next, about 750 g of the obtained raw fibers and about 75 kg of water are put into an agitator and agitated for about one to about five minutes. About 4 wt % to about 8 wt % of an organic binder is added to the resulting liquid and the liquid is agitated for about one to about five minutes. Then, about 0.5 wt % to about 1.0 wt % of an inorganic binder is added to the liquid and the liquid is agitated for about one to about five minutes. Further, about 0.5 wt % of a flocculant is added to the liquid and the liquid is agitated for about two minutes to prepare slurry.

As the inorganic binder, for example, alumina sol and/or silica sol may be used. As the organic binder, for example, a rubber-based material, a water-soluble organic high polymer, a thermoplastic resin, or a thermo-setting resin may be used. As the flocculant, for example, PERCOL® 292 (Ciba Specialty Chemicals) may be used.

The slurry is poured into a mold to form short-fiber mat material and the short-fiber mat material is dehydrated. A filtration mesh (mesh count: 30) may be provided at the bottom of the mold to allow the drainage of water in the slurry. With such a mold, it is possible to perform molding and dehydration of a short-fiber mat material at the same time. Also, water in the short-fiber mat material may be suctioned via the filtration mesh using, for example, a suction pump or a vacuum pump.

Then, the short-fiber mat material is taken out of the mold, pressed by a pressing machine to a thickness about 0.3 to about 0.5 times as large as the original thickness, and heated and dried, for example, at about 90° C. to about 150° C. for about five minutes to about one hour to produce a short-fiber mat.

The produced short-fiber mat may be impregnated at this stage with a binder as described above. Alternatively, when a laminated sheet is produced by the indirect lamination method, the impregnation step may be performed after the short-fiber mat and the long-fiber mat are bonded.

A short-fiber mat composed of inorganic fibers having an average fiber length between about 0.5 mm and about 10 mm is prepared through the process as described above.

(Combining Short-Fiber Mat and Long-Fiber Mat)

The short-fiber mat and the long-fiber mat prepared as described above are combined to produce a laminated sheet according to an embodiment of the present invention.

To combine the mats, the indirect lamination method or the direct lamination method may be used. In the direct lamination method, a prepared long-fiber mat is placed on the bottom of the mold used in the above exemplary process and a short-fiber mat is formed on the long-fiber mat. Thus, with the direct lamination method, the long-fiber mat and the short-fiber mat are combined in the short-fiber mat preparation process. Compared with a method where the long-fiber mat and the short-fiber mat are prepared separately, the direct lamination method makes it possible to simplify the laminated sheet production process.

One possible problem with the direct lamination method is that the adhesion strength at the interface between the long-fiber mat and the short-fiber mat of a produced laminated sheet may become low. However, according to test results, the adhesion strength at the interface between the long-fiber mat and the short-fiber mat of a laminated sheet produced by the direct lamination method was as excellent as that of a laminated sheet produced by the indirect lamination method. As shown in FIG. 6, formation of a third layer 86 (an interface layer) is observed at the interface between the long-fiber mat 82 and the short-fiber mat 84 of the laminated sheet 30 produced by the direct lamination method. It is presumed that the binder added to the slurry when preparing the short-fiber mat 84 concentrates at the interface and forms the third layer 86. It is also presumed that the third layer 86 functions as an adhesive layer and thereby increases the adhesion strength at the interface between the long-fiber mat 82 and the short-fiber mat 84. The thickness of the third layer 86, although varying depending on the production conditions of the laminated sheet 30, is between about 0.05 mm and about 2 mm.

FIG. 7 is a flowchart showing an exemplary process of producing an exhaust gas processing device using a laminated sheet according to an embodiment of the present invention. In step S210, a laminated sheet is prepared by laminating a long-fiber mat and a short-fiber mat as described above. In step S220, the prepared laminated sheet is wound around an exhaust gas processing unit such that the long-fiber mat faces outward. Then, in step S230, the exhaust gas processing unit wrapped by the laminated sheet is fitted into a casing by a press-fit method, a clamshell method, a winding/fastening method, or a sizing method to form an exhaust gas processing device.

The methods of fitting the exhaust gas processing unit into the casing are described below with reference to the accompanying drawings. FIGS. 8, 9, 10, and 11 are drawings illustrating the methods of fitting the exhaust gas processing unit 20 wrapped by the holding sealer 24 (hereafter called a wrapped exhaust gas processing unit 210) into a casing.

In the press-fit method, the wrapped exhaust gas processing unit 210 is pressed into a casing 121 through one of its openings to produce the exhaust gas processing device 10. To make it easier to insert the wrapped exhaust gas processing unit 210 into the casing 121, a press-fitting jig 230 may be used. As shown in FIG. 8, the inner diameter of the press-fitting jig 230 decreases gradually from one end to the other and the minimum inner diameter of the press-fitting jig 230 is substantially the same as the inner diameter of the casing 121. The wrapped exhaust gas processing unit 210 is inserted into the press-fitting jig 230 through its wider opening and pressed into the casing 121 through the narrower opening of the press-fitting jig 230.

In the clamshell method, a casing made up of multiple casing parts is used. In FIG. 9, a casing 122 is made up of opposing casing parts 122A and 122B. The wrapped exhaust gas processing unit 210 is placed in a first one of the casing parts 122A and 122B and a second one of the casing parts 122A and 122B is coupled to the first one to produce the exhaust gas processing device 10. The casing parts 122A and 122B are joined, for example, by welding flanges 220 (220A and 220B) together.

Figure 10:
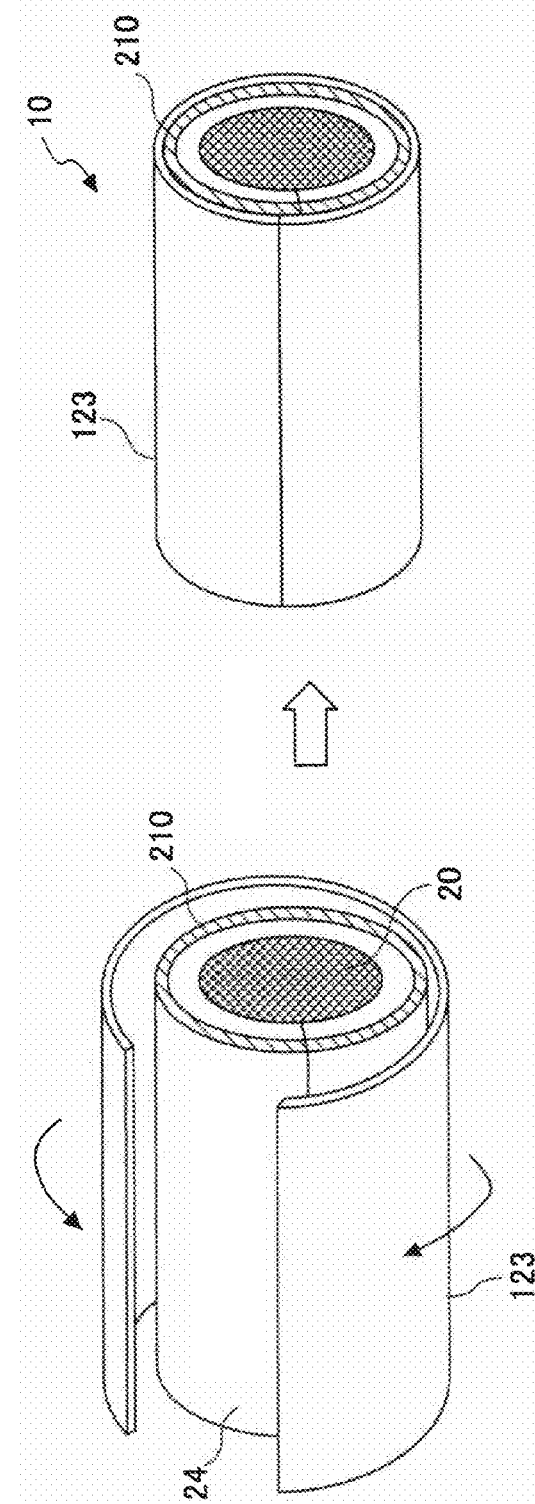
FIG. 10 is a drawing illustrating a process of fitting an exhaust gas processing unit wrapped by a holding sealer in a casing by a winding/fastening method.

In the winding/fastening method, as shown in FIG. 10, a metal plate (casing) 123 to be used as a casing is wound around the wrapped exhaust gas processing unit 210 and tied and pressed, for example, with a wire rope onto the outer surface of the wrapped exhaust gas processing unit 210 to produce a predetermined contact pressure. Then, the ends of the metal plate 123 are welded together to produce the exhaust gas processing device 10 where the wrapped exhaust gas processing unit 210 is fitted in the casing 123.

Figure 11:
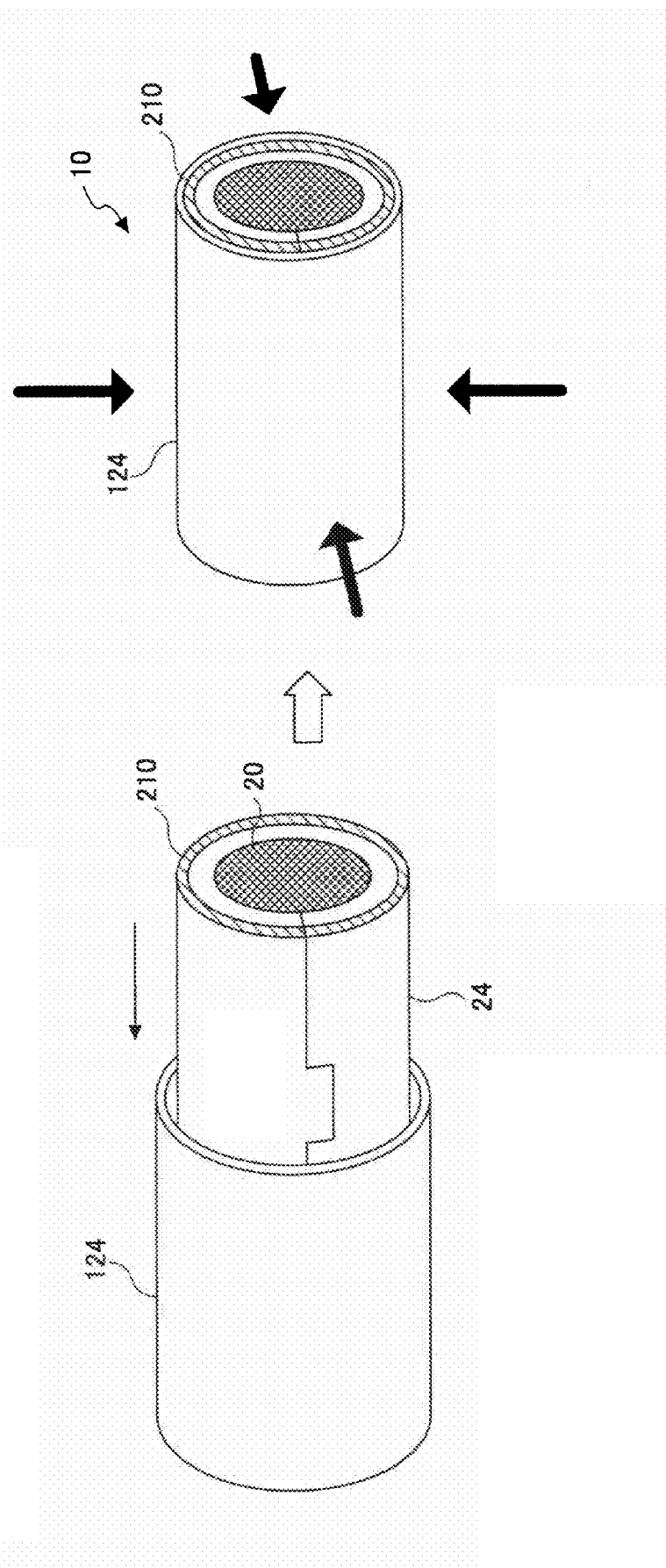
FIG. 11 is a drawing illustrating a process of fitting an exhaust gas processing unit wrapped by a holding sealer in a casing by a sizing method.

In the sizing method, as shown in FIG. 11, the wrapped exhaust gas processing unit 210 is inserted into a metal shell 124 having an inner diameter that is larger than the outer diameter of the wrapped exhaust gas processing unit 210. Then, the outer surface of the metal shell 124 is uniformly pressed, for example, by a press machine to reduce the size of the metal shell 124 (sizing: JIS Z2500-4002). This sizing step makes it possible to accurately adjust the inner diameter of the metal shell 124 to fit the wrapped exhaust gas processing unit 210.

The material of a casing used in the above fitting methods is preferably a metal such as a heat-resistant alloy.

As described above, a laminated sheet according to an embodiment of the present invention is made up of a first mat that is stronger and composed of inorganic fibers having a larger average fiber length and a second mat composed of inorganic fibers having a shorter average fiber length. The laminated sheet is wound around an exhaust gas processing unit such that the first mat faces outward. This configuration reduces the influence of the difference between the outer and inner circumferences of the laminated sheet and thereby reduces development of cracks in the outer surface of the laminated sheet even when its thickness is large. Also, unlike a conventional sheet having grooves for reducing the influence of the difference between outer and inner circumferences, a laminated sheet according to an embodiment of the present invention can be used for exhaust gas processing units having different shapes and dimensions without changing its configuration and therefore can be produced efficiently.

In the above embodiments, a laminated sheet is composed of two mats: a long-fiber mat and a short-fiber mat. However, a laminated sheet according to the present invention may also be made up of three or more mats as long as the outermost mat, which faces outward when wound around an exhaust gas processing unit, of the laminated sheet is composed of fibers having the average fiber length larger than the average fiber lengths of other mats. Also, another embodiment of the present invention provides an exhaust gas processing device including such a laminated sheet as a holding sealer.

To evaluate the advantageous effects of the present invention, sheets were produced and tests were performed on the produced sheets as described below.

EXAMPLE 1

A laminated sheet of example 1 was produced as described below.

First, a long-fiber mat was produced. A precursor of alumina fibers ($Al_2O_3$:$SiO_2$=72:28) was prepared by adding silica sol to a basic aluminum chloride solution (aluminum content: 70 g/l, Al/Cl=1.8 [atomic ratio]). Next, an organic polymer of polyvinyl alcohol was added to the precursor of alumina fibers. The resulting liquid was concentrated to form a spinning solution and the spinning solution was spun by a blowing method. The obtained alumina fibers were folded and stacked to prepare a raw sheet of alumina fibers. Then, a needling step was performed on the raw sheet. The needling step was performed from both sides of the raw sheet using a pair of needle boards placed above and below the raw sheet, each of the needle boards having needles arranged at a density of 50 needles per 100 $cm^2$. The resulting raw sheet had interwoven points at a density of 1/$cm^2$.

After the needling step, the raw sheet was heated from the ambient temperature and calcined for one hour at a maximum temperature of 1250° C. to produce a long-fiber mat with a grammage of 950 g/$m^2$ and a thickness of 4 mm. The average fiber length of the alumina fibers was about 50 mm. The average diameter of the alumina fibers was 6.2 μm and the minimum diameter was 3.2 μm.

Then, a short-fiber mat was formed directly on the prepared long-fiber mat as described below.

First, opened inorganic fibers were prepared as raw fibers. In this example, alumina fibers (hereafter called "cotton bulk") composed of alumina and silica (mixture ratio 72:28) were used.

Next, 790 g of the cotton bulk was mixed with 79 kg of water and the mixture was agitated for five minutes using an agitator. Then, 39.5 g of an organic binder (latex) was added to the resulting liquid and the liquid was agitated for five minutes. After that, 7.9 g of an inorganic binder (alumina sol) was added to the liquid and the liquid was agitated for five minutes. Further, 3.95 g of a flocculant (PERCOL® 292) was added to the liquid and the liquid was agitated for one minute to prepare slurry.

In the next step, the prepared long-fiber mat was placed on the bottom, which is formed as a filtration mesh (mesh count: 30), of a mold (930 mm (length)×515 mm (width)×400 mm (depth)). The dimensions of the long-fiber mat were 930 mm (length)×515 mm (width)×4 mm (thickness). The prepared slurry was poured onto the long-fiber mat and dehydrated to form a short-fiber mat. In the dehydration step, water in the slurry was suctioned via the filtration mesh at the bottom of the mold using a suction pump. The stacked long-fiber and short-fiber mats were taken out of the mold and press-dried for 30 minutes at 120° C. and 70 kPa. Through the above steps, a short-fiber mat having a grammage of 1750 g/$m^2$ and a thickness of 9 mm was formed on the long-fiber mat. The average fiber length of the alumina fibers in the short-fiber mat was about 3 mm.

Thus, in example 1, a laminated sheet with a thickness of 13 mm and a density of 0.21 g/$cm^3$ was prepared.

EXAMPLE 2

First, a long-fiber mat was prepared in substantially the same manner as in example 1, except that the amount of stacked alumina fibers was changed. The grammage of the prepared long-fiber mat was 1350 g/$m^2$ and the thickness was 6 mm. The average fiber length of the alumina fibers was about 50 mm. The average diameter of the alumina fibers was 6.2 μm and the minimum diameter was 3.2 μm.

Next, 610 g of cotton bulk made of alumina fibers composed of alumina and silica (mixture ratio 72:28) was mixed with 61 kg of water and the mixture was agitated for five minutes using an agitator. Then, 30.5 g of an organic binder (latex) was added to the resulting liquid and the liquid was agitated for five minutes. After that, 6.1 g of an inorganic binder (alumina sol) was added to the liquid and the liquid was agitated for five minutes. Further, 3.05 g of a flocculant (PERCOL® 292) was added to the liquid and the liquid was agitated for one minute to prepare slurry.

In the next step, the prepared long-fiber mat (with a grammage of 1350 g/$m^2$) was placed on the bottom, which is formed as a filtration mesh (mesh count: 30), of a mold (930 mm (length)×515 mm (width)×400 mm (depth)). The dimensions of the long-fiber mat were 930 mm (length)×515 mm (width)×6 mm (thickness). The prepared slurry was poured onto the long-fiber mat and dehydrated to form a short-fiber mat. In the dehydration step, water in the slurry was suctioned via the filtration mesh at the bottom of the mold using a suction pump. The stacked long-fiber and short-fiber mats were taken out of the mold and press-dried for 30 minutes at 120° C. and 70 kPa. Through the above steps, a short-fiber mat having a grammage of 1350 g/$m^2$ and a thickness of 7 mm was formed on the long-fiber mat. The average fiber length of the alumina fibers in the short-fiber mat was about 3 mm.

Thus, in example 2, a laminated sheet with a thickness of 13 mm and a density of 0.21 g/$cm^3$ was prepared.

EXAMPLE 3

First, a long-fiber mat was prepared in substantially the same manner as in example 1, except that the amount of stacked alumina fibers was changed. The grammage of the prepared long-fiber mat was 950 g/$m^2$ and the thickness was 4 mm. The average fiber length of the alumina fibers was about 50 mm. The average diameter of the alumina fibers was 6.2 μm and the minimum diameter was 3.2 μm.

Next, 430 g of cotton bulk made of alumina fibers composed of alumina and silica (mixture ratio 72:28) was mixed with 43 kg of water and the mixture was agitated for five minutes using an agitator. Then, 21.5 g of an organic binder (latex) was added to the resulting liquid and the liquid was agitated for five minutes. After that, 4.3 g of an inorganic binder (alumina sol) was added to the liquid and the liquid was agitated for five minutes. Further, 2.15 g of a flocculant (PERCOL® 292) was added to the liquid and the liquid was agitated for one minute to prepare slurry.

In the next step, the prepared long-fiber mat (with a grammage of 950 g/$m^2$) was placed on the bottom, which is formed as a filtration mesh (mesh count: 30), of a mold (930 mm (length)×515 mm (width)×400 mm (depth)). The dimensions of the long-fiber mat were 930 mm (length)×515 mm (width)×4 mm (thickness). The prepared slurry was poured onto the long-fiber mat and dehydrated to form a short-fiber mat. In the dehydration step, water in the slurry was suctioned via the filtration mesh at the bottom of the mold using a suction pump. The stacked long-fiber and short-fiber mats were taken out of the mold and press-dried for 30 minutes at 120° C. and 70 kPa. Through the above steps, a short-fiber mat having a grammage of 950 g/$m^2$ and a thickness of 5 mm was formed on the long-fiber mat. The average fiber length of the alumina fibers in the short-fiber mat was about 3 mm.

Thus, in example 3, a laminated sheet with a thickness of 9 mm and a density of 0.21 g/cm³ was prepared.

COMPARATIVE EXAMPLE 1

In comparative example 1, 1220 g of cotton bulk made of alumina fibers composed of alumina and silica (mixture ratio 72:28) was mixed with 122 kg of water and the mixture was agitated for five minutes using an agitator. Then, 61 g of an organic binder (latex) was added to the resulting liquid and the liquid was agitated for five minutes. After that, 12.2 g of an inorganic binder (alumina sol) was added to the liquid and the liquid was agitated for five minutes. Further, 6.1 g of a flocculant (PERCOL® 292) was added to the liquid and the liquid was agitated for one minute to prepare slurry.

In the next step, the prepared slurry was poured into a mold (930 mm (length)×515 mm (width)×400 mm (depth)) having a filtration mesh (mesh count: 30) at the bottom and was dehydrated to form a short-fiber mat. In the dehydration step, water in the slurry was suctioned via the filtration mesh at the bottom of the mold using a suction pump. Then, the short-fiber mat was taken out of the mold and press-dried for 30 minutes at 120° C. and 70 kPa. Thus, in comparative example 1, a single layer sheet composed only of a short-fiber mat with a grammage of 2700 g/m², a thickness of 13 mm, and a density of 0.21 g/cm³ was prepared. The average fiber length of the alumina fibers in the single-layer sheet was about 3 mm.

COMPARATIVE EXAMPLE 2

In comparative example 2, 860 g of cotton bulk made of alumina fibers composed of alumina and silica (mixture ratio 72:28) was mixed with 86 kg of water and the mixture was agitated for five minutes using an agitator. Then, 43 g of an organic binder (latex) was added to the resulting liquid and the liquid was agitated for five minutes. After that, 8.6 g of an inorganic binder (alumina sol) was added to the liquid and the liquid was agitated for five minutes. Further, 4.3 g of a flocculant (PERCOL® 292) was added to the liquid and the liquid was agitated for one minute to prepare slurry.

In the next step, the prepared slurry was poured into a mold (930 mm (length)×515 mm (width)×400 mm (depth)) having a filtration mesh (mesh count: 30) at the bottom and was dehydrated to form a short-fiber mat. In the dehydration step, water in the slurry was suctioned via the filtration mesh at the bottom of the mold using a suction pump. Then, the short-fiber mat was taken out of the mold and press-dried for 30 minutes at 120° C. and 70 kPa. Thus, in comparative example 2, a single layer sheet composed only of a short-fiber mat with a grammage of 1900 g/m², a thickness of 9 mm, and a density of 0.21 g/cm³ was prepared. The average fiber length of the alumina fibers in the single-layer sheet was about 3 mm.

Table 1 shows grammages, thicknesses, and densities of the laminated sheets of examples 1 through 3 and the single-layer sheets of comparative examples 1 and 2. In table 1, grammages are provided separately for long-fiber mats and short-fiber mats and individual thicknesses of long-fiber mats and short-fiber mats are provided in addition to the thicknesses of sheets.

TABLE 1

| Example/ Comparative example | Long-fiber mat Grammage (g/m²) | Long-fiber mat Thickness (mm) | Short-fiber mat Grammage (g/m²) | Short-fiber mat Thickness (mm) | Sheet thickness (mm) | Sheet density (g/cm³) | Winding test results |
|---|---|---|---|---|---|---|---|
| Example 1 | 950 | 4 | 1750 | 9 | 13 | 0.21 | ○ |
| Example 2 | 1350 | 6 | 1350 | 7 | 13 | 0.21 | ○ |
| Example 3 | 950 | 4 | 950 | 5 | 9 | 0.21 | ○ |
| Comparative example 1 | | | 2700 | 13 | 13 | 0.21 | X |
| Comparative example 2 | | | 1900 | 9 | 9 | 0.21 | X |

<Evaluation Test>

Using the sheets prepared as described above, a winding test was performed. In the winding test, each sheet was wound around a cylinder having an outer diameter of 5 inches and ends of the sheet were fitted together to fix it to the cylinder. Then, development of cracks in the outer surface of each sheet was checked for by eye observation. Each of the laminated sheets of examples 1 through 3 was wound around the cylinder such that the long-fiber mat faces outward.

<Test Results>

Figure 12:
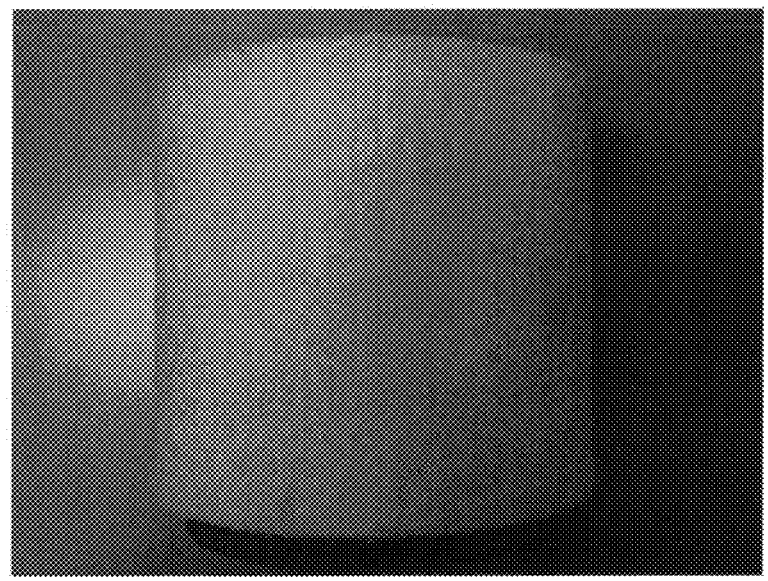
FIG. 12 is a photograph of a laminated sheet of example 1 used in a winding test.
Figure 13:
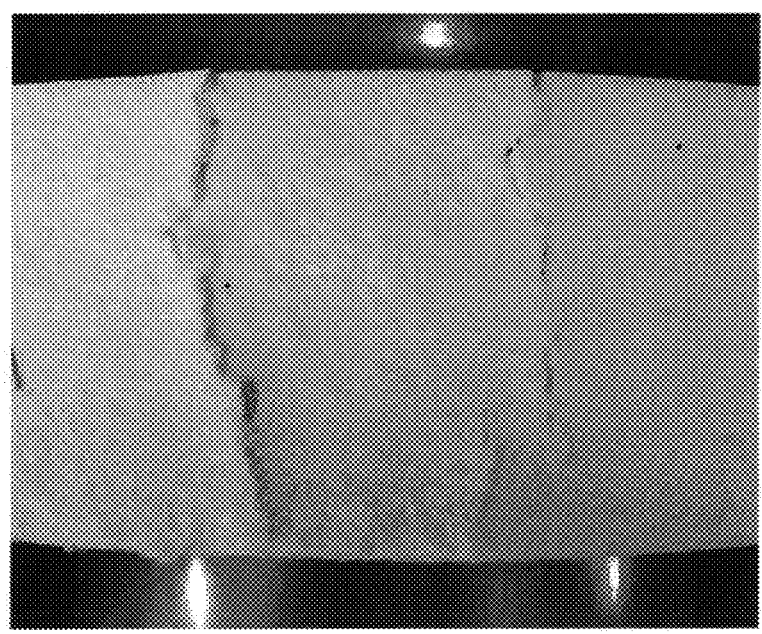
FIG. 13 is a photograph of a single-layer sheet of comparative example 1 used in a winding test.

The results of the winding test are shown in table 1 above. FIG. 12 is a photograph of the laminated sheet of example 1 used in the winding test. FIG. 13 is a photograph of the single-layer sheet of comparative example 1 used in the winding test. As shown in table 1, cracks were not observed in the outer surfaces of the laminated sheets of examples 1 through 3. On the other hand, cracks were observed on the outer surfaces of the single-layer sheets of comparative examples 1 and 2. The test results indicate that a laminated sheet composed of a long-fiber mat and a short-fiber mat according to an embodiment of the present invention shows sufficient strength even when the thickness is large.

Laminated sheets according to embodiments of the present invention can be used as components of exhaust gas processing devices for automobiles.

The present invention is not limited to the specifically disclosed embodiments, and variations and modifications may be made without departing from the scope of the present invention.

What is claimed is:

1. A method of producing a laminated sheet having a predetermined outermost surface to be the outermost surface when the laminated sheet is wound around an outer surface of an exhaust gas processing unit, the method comprising:
   preparing a first mat containing first inorganic fibers; and
   forming a second mat containing second inorganic fibers on the first mat, such that a surface of the first mat which opposes the second mat is the predetermined outermost surface, wherein an average fiber length of the first inorganic fibers is larger than an average fiber length of the second inorganic fibers, and the second mat is formed on the first mat by:
      pouring slurry onto the first mat,
      dehydrating the slurry, and forming an interface layer having a thickness between 0.05 mm and about 2 mm between the first mat and the second mat.

2. The method as claimed in claim 1, wherein the first mat is prepared by a needling method.

3. The method of claim 1, wherein said forming an interface layer comprises setting at least one predetermined process condition to provide said interface layer having a thickness between 0.05 mm and about 2 mm.

4. The method of claim 3, further comprising suctioning water from the short-fiber mat material, wherein said setting comprises setting a suctioning condition to provide said interface layer having a thickness between 0.05 mm and about 2 mm.

5. The method of claim 3, wherein said setting comprises setting a dehydration time to provide said interface layer having a thickness between 0.05 mm and about 2 mm.

6. A method of producing an exhaust gas processing device including an exhaust gas processing unit and a holding sealer wound around at least a portion of an outer surface of the exhaust gas processing unit, comprising the steps of:
    preparing the holding sealer with the laminated sheet produced by the method as claimed in claim 1; and
    winding the holding sealer around the exhaust gas processing unit such that the first mat of the laminated sheet forms an outermost layer.

7. The method as claimed in claim 6, wherein the exhaust gas processing unit is a catalyst carrier or an exhaust gas filter.

* * * * *